Feb. 14, 1933.  J. E. PATTERSON  1,897,509
WHEELED SCOOP
Original Filed Feb. 21, 1929   4 Sheets-Sheet 1
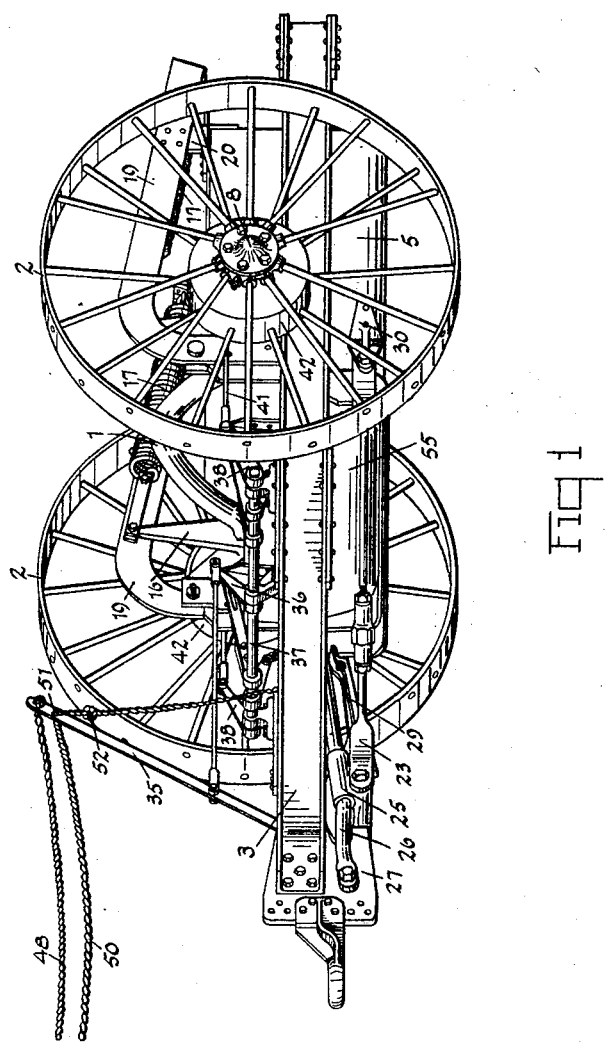
Inventor
Julius E. Patterson
By Fay, Oberlin & Fay
Attorneys Feb. 14, 1933. J. E. PATTERSON 1,897,509
WHEELED SCOOP
Original Filed Feb. 21, 1929 4 Sheets-Sheet 2
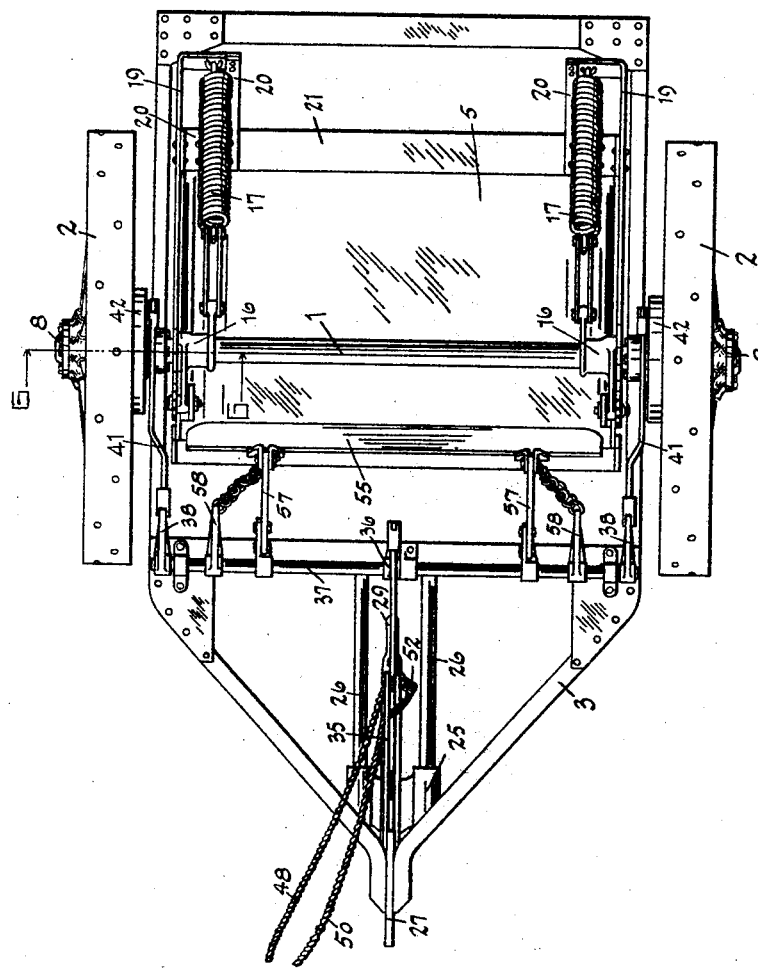

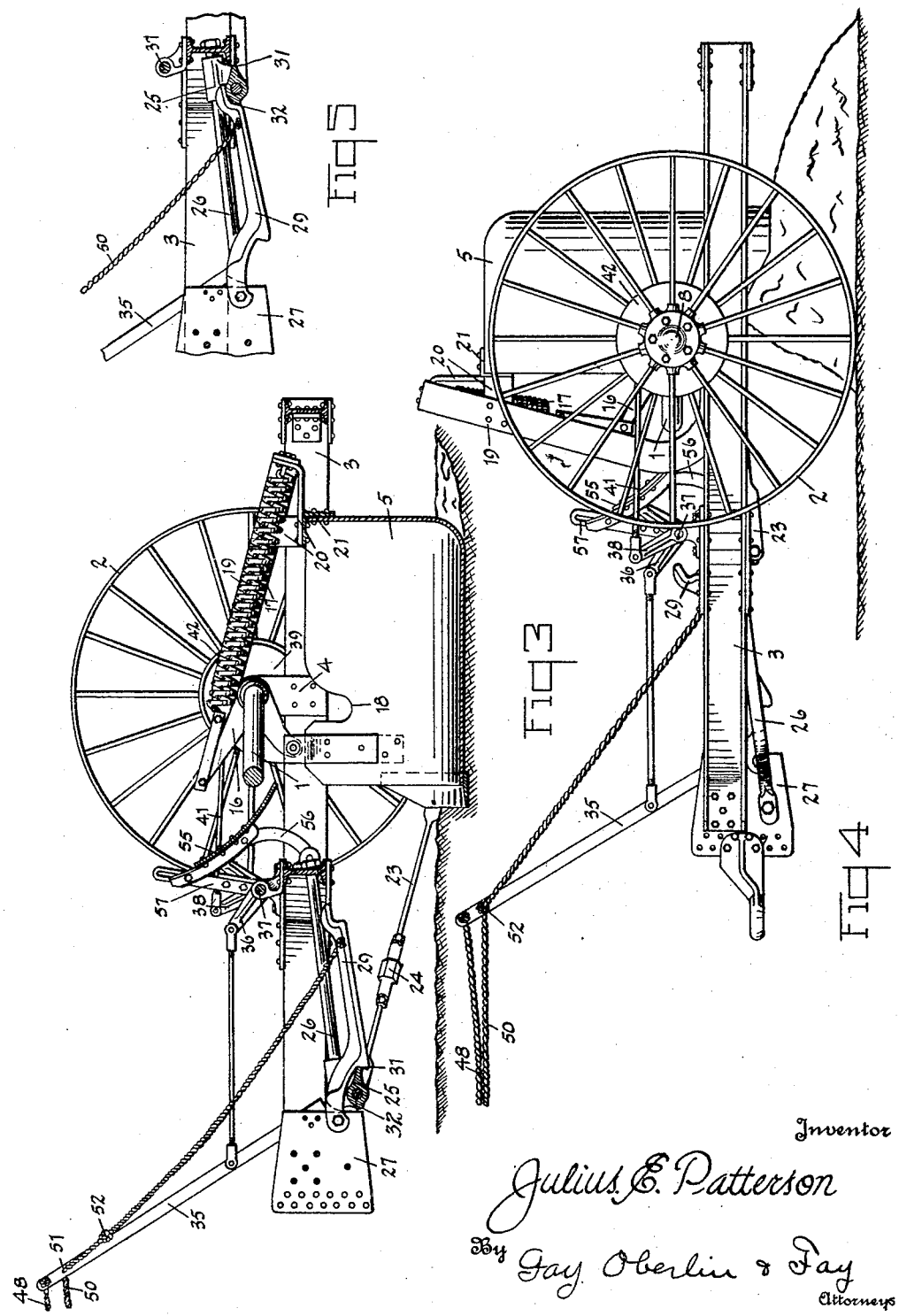

Feb. 14, 1933. J. E. PATTERSON 1,897,509
WHEELED SCOOP
Original Filed Feb. 21, 1929 4 Sheets-Sheet 4
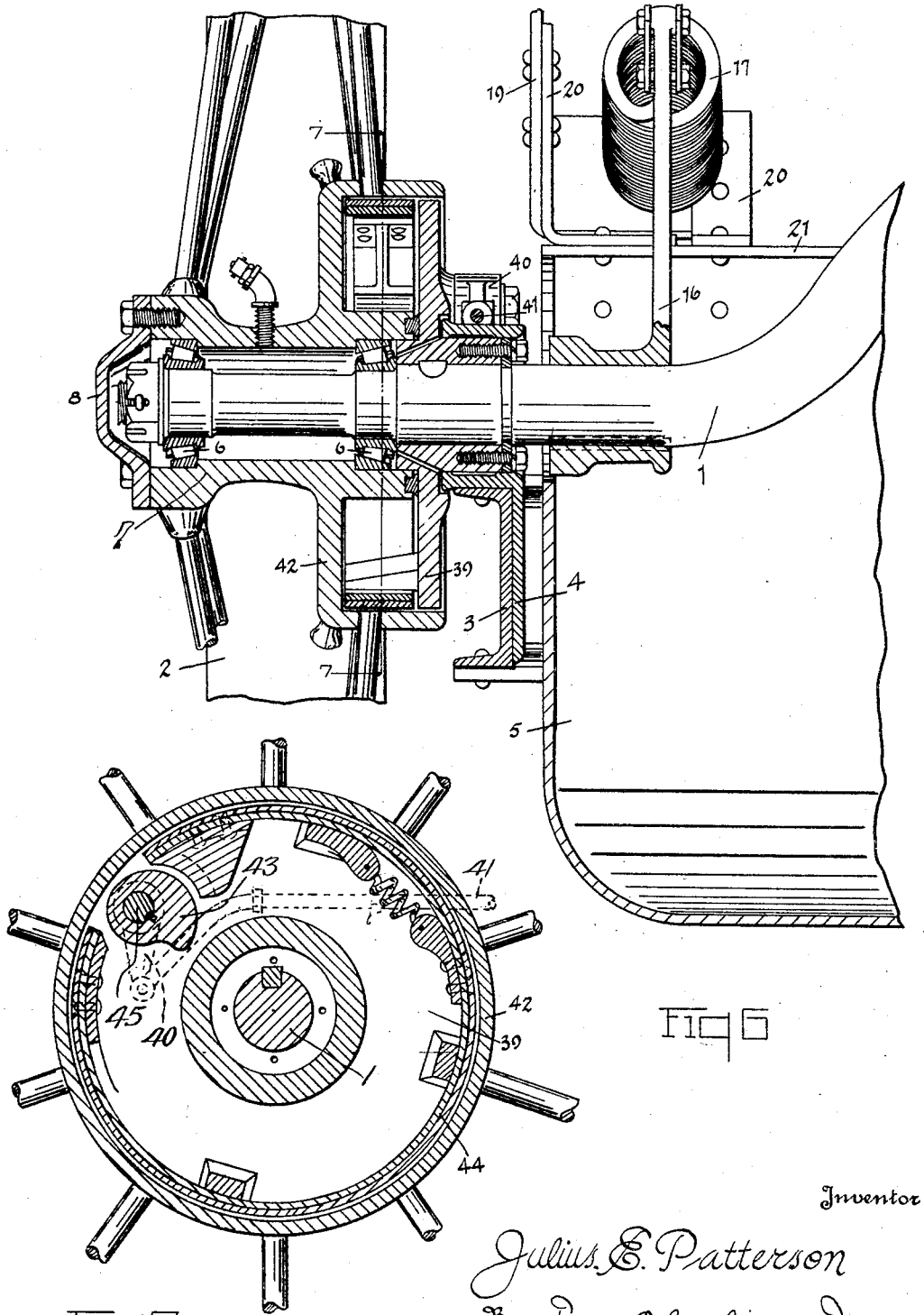

Patented Feb. 14, 1933

1,897,509

UNITED STATES PATENT OFFICE

JULIUS E. PATTERSON, OF BUCYRUS, OHIO, ASSIGNOR TO DUNN-PATTERSON COMPANY, OF KLAMATH FALLS, OREGON, A CORPORATION OF OREGON

WHEELED SCOOP

Refile for abandoned application Serial No. 341,749, filed February 21, 1929. This application filed September 4, 1930. Serial No. 479,731.

My invention has for its object to provide a vehicular scoop having a mechanism for interconnecting the scoop with the wheels of the vehicle and thus tractionally provide the force or energy for manipulating the scoop. The invention particularly provides a controlling means for the interconnecting mechanism whereby the scoop member may be manipulated by the resistance counter to rotation of the wheels as the vehicle is drawn over the ground. The parts of the interconnecting mechanism and the controlling means are so located that they will not interfere with the load either in gathering, carrying, or dumping the material. Furthermore, the controlling means is of such a character that the manipulation and control of a plurality of wheeled scoops may be performed simultaneously by a single operator as, for example, an operator of a tractor. Thus a plurality of wheeled scoops containing my invention may be connected together and drawn by a tractor and operated by the driver so as to gather, convey, and load large quantities of material.

The invention also provides a reduction of the number of parts heretofore used in controlled wheeled scoops and a simplification of such parts whereby I have provided an exceedingly durable and efficient wheeled scoop. Thus, by my invention, there are very few exposed parts of the controlling means and the lubrication is greatly simplified with the result that the scoop is exceedingly durable and efficient and requires very little attention and practically no replacement of parts in its up-keep. The invention provides other features and advantages which will appear upon examination of the drawings and from the description hereinafter.

The invention may be contained in scoops that vary in their details of construction and, to illustrate a practical application of my invention, I have selected a scoop containing the invention as an example of such structures and shall describe it hereinafter. The particular structure selected is shown in the accompanying drawings.

Fig. 1 of the drawings is a perspective view of the wheeled scoop, and illustrates the scoop member in load carrying position; Fig. 2 is a top view of the scoop shown in Fig. 1; Fig. 3 is a view of a longitudinal section of the wheeled scoop when the scoop member is located in position for gathering dirt at a level below that of the wheels; Fig. 4 illustrates a side view of the scoop when the scoop member is in dumping position; Fig. 5 is a detailed view showing a part of the mechanism for maintaining the scoop member in the dumping position; Fig. 6 is a view of a section taken on the plane of the line 6—6 indicated in Fig. 2; Fig. 7 is a view of a section taken on the plane of the line 7—7 indicated in Fig. 6.

In the wheeled scoop shown in the drawings, the parts are supported by the shaft 1 on which the wheels 2 rotate. The frame 3 of the scoop is suspended from the shaft 1 by the brackets 4 in which the shaft is rotatable. The scoop member 5 is connected to the shaft and is manipulated by the rotation of the shaft relative to the frame which is induced by the connection of the shaft to, and its disconnection from, the wheels. The ends of the shaft are provided with roller bearings 6, while the outer ends of the hubs 7 of the wheels are capped by means of the caps 8 whereby the interior of the hubs may be filled with a lubricant.

The forward upper corners of the scoop member 5 are pivotally connected to bell crank levers 16 that are keyed to the shaft and, consequently, the bell crank levers 16 are rotated upon the rotation of the shaft 1 in the brackets 4. The movement of the bell crank levers 16 is yieldingly resisted by springs 17 that are connected to the rear end of the scoop member 5.

When the bottom of the scoop is held substantially horizontal and the shaft is rotated by its connection with the wheels, the scoop member 5 is lowered and the springs 17 are subjected to a tension that yieldingly resists the rotation of the shaft. When the shaft 1 is released from its connection with the wheels, the tension of the springs 17 operate on the bell crank levers 16 to raise the scoop. In order that the bell crank levers 16 may raise the forward end of the scoop to a point so that the upper edges of the sides of the scoop 5 will be located well above the axis of the wheels 2, the side edges of the scoop 5 are recessed as at 18 to receive the shaft and permit the extended upward movement of the scoop relative to the shaft. Also, the bottom edge portion of the recess affords a limiting stop to the upward movement which is produced by the springs 17.

The scoop member 5 is provided with a pair of goose-neck arms 19 that are rigidly connected to the front and the rear of the scoop member. The forward ends of the arms are connected to the side forward portions of the scoop member, while the rear ends of the arms are connected by means of the brackets 20 to an angle iron 21 that extends across and is secured to the rear end of the scoop member. The arms are located in the planes of the sides of the scoop member so as to leave the spaces above the scoop member open and free from any obstruction when filling or loading or unloading the scoop. Inasmuch as the arms 19 are connected to the forward and rear ends of the scoop 5 and the rear ends of the spring 17 are connected to the scoop 5 through the same construction an exceedingly rigid scoop structure is afforded.

The scoop member 5 is held in its material gathering position by the maintenance of the position on the shaft 1 relative to the frame 3 against the tension of the springs 17. The shaft 1 is maintained in its position by a slip frictional connection with the wheels 2, as the wheels 2 rotate along the surfaces of the ground. This is accomplished by friction clutches. When, therefore, the scoop member 5 has been filled with the desired amount of dirt, or other material, the clutch connection between the shaft 1 and the wheels 2 is released and the springs 17 operate to raise the scoop member to a load carrying position. When it is desired to dump the scoop 5, the bottom of the scoop member is released from its horizontal relation, and the shaft is again connected to the wheels 2 by means of the friction clutches. Upon release of the shaft 1 from the wheels 2, the scoop 5 will drop by its own weight to its load carrying position. The shaft 1 is formed substantially semi-circular in its central portion so that as the shaft is rotated to cause the operation of the scoop member, the arcuate portion of the shaft rotates about the axis of the shaft in such direction that in either loading or dumping positions of the scoop, the central portion of the shaft will allow for free movement of the material.

When the scoop is gathering material, the bottom of the scoop is held in its horizontal position and the lower edge of the scoop is directly drawn by means of a pair of adjustable links 23. The links are adjusted by means of the turnbuckles 24. The tension members or links 23 are connected to a head 25 which is slidably supported on a pair of guide rods 26 and to the scoop by the brackets 30. The guide rods 26 are connected to a clevis plate 27 and to the frame 3. The head 25 is provided with two engaging surfaces 31 and 32 located at the front and the rear of the head and a double latch arm 29 is pivotally supported on the frame 3, preferably, on the clevis plate 27, for engaging the head 25 at two points along the latch arm. The head 25 is engaged by the latch arm 29 when the scoop member 5 is located in dirt gathering position, as shown in Fig. 3, and when the head is at the clevis plate and again in the scoop dumping position, as shown in Fig. 5, when the head is at the rear ends of the guide rods 26 where they are connected to the frame 3. Thus, when the scoop member 5 is located in dirt gathering position and in load carrying position, the head 25 is secured by the latch 29 at the forward ends of the rods 26 which holds the bottom of the scoop substantially horizontal, but when the head 25 is released, raising the latch 29 from this position, it may slide along the rods 26 until it is brought to a stop by contact with the frame 3 at the ends of the rods as the scoop is turned to dump the load. The scoop may be held in its scoop dumping position by means of the latch 29 since the links 23 operate to hold the lower edge of the scoop 5 in substantially a horizontal plane and the bottom of the scoop 5 in substantially a vertical plane.

When, therefore, it is again desired to load the scoop, the latch arm 29 is raised, which permits the scoop to drop to its load carrying position by its own weight. The clutch connection between the shaft 1 and the wheels 2 is then established whereby the bell crank levers 16 will be operated so as to force the forward end of the scoop 5 to the ground where it will be held by the operation of the clutch parts against the tension of the springs 17. When the scoop member 5 has been filled, the clutch parts may again be released and upon release of the clutches, the springs 17 will again operate to raise the scoop to its load carrying position.

The clutch connection between the shaft 1 and the wheels 2, and also the latch member 29, is controlled by means of the lever 35. The lever 35 is connected to the arm 36 which is keyed to the shaft 37. The shaft 37 has the arms 38 which are connected to the clutch members 39. The clutch members 39 are provided with arms 40 to which the arms 38 are connected by means of the links 41. The wheels are also provided with clutch members 42 which coact with the clutch members 39. The clutch connection between the clutch members is established by means of the cams 43 that operate to expand friction bands 44 connected to the arms 40 by means of the shafts or pins 45, while the clutch members 39 are keyed to the shaft 1, and thus the clutch members 39, together with the arms 40, rotate with the shaft 1 upon engagement of the clutch and, consequently, the arms 36 and 38 must also be moved forward by the operation of the lever 35 to maintain the clutch in its engaging relations with the shaft 1. Since the shaft 1 operates the scoop 5, the lever 35 is moved in accordance with the downward movement of the scoop 5 to load and also, in its rotative movements, to unload.

It will be noted from Fig. 7 that the clutches are of the self-energizing type, that is to say, as soon as sufficient force is exerted on the rod 41 to move the clutch band into engagement with the drum, the rotation of the drum tends to assist the force of the rod 41 in maintaining engagement of the clutch as the wheels move in a clockwise direction. When, however, the wheels rotate counterclockwise, the force required to energize the clutches is many times that required when the wheels rotate clockwise.

The latch arm 29 is preferably connected to the lever 35 by means of a suitable slip connection whereby the lever 35 may be operated to establish the clutch connection between the shaft and the wheels without operating the latch 29. This is done when the scoop 5 is lowered to its loading position and the draw-head 25 is held engaged by the latch arm 29 near the clevis plate 27. When the scoop member 5 is to be raised to its dumping position from the carrying position, the latch arm may be operated to release the draw-head 25. Thus the lever 35 may be operated by the slip connection between the latch 29 and the lever, whereby the lever 35 may be operated to lower the scoop to its loading position or the lever and the latch may both be operated at the same time to raise the scoop 5 to its dumping position. If it is desired to retain the scoop in its semi-inverted position, the latch 29 may be operated independently of the lever 35 and when the scoop has swung to its dumping or semi-inverted position, the latch 29 will engage the draw-head 25 when it reaches the crossbar or beam of the frame 3 and the scoop will be held in its dumping position. If it is desired to drop the scoop from this position to the loading gathering position, the latch 29 is first operated to release the draw-head 25 and then the lever 35 is operated by using the slip connection between the lever and the latch.

In the form of construction shown, the lever 35 is manipulated from the tractor by means of a rope 48 which may be secured in the upper end of the lever. When it is desired to lower the scoop 5, the rope 48 will operate the levers 35, 36, and 38, to establish the clutch connection between the shaft 1 and the wheels 2. As the desired load is gathered, the clutch is disengaged by release of the rope and the springs 17 raise the scoop to its carrying position. The scoop may be further raised or rotated about the axis of the shaft 1 to the dumping position by manipulating a second rope 50. The rope 50 connects the latch 29 to the lever 35, passing through a hole 51 in the upper end of the lever. The rope 50 may be provided with a knot 52, or other means, for limiting the movement of the rope through the opening 51. The knot 52 is so located with respect to the upper end of the lever 35, that on pulling the rope 50, the rope will slip through the opening 51 and lift the latch 29 before the lever 35 is operated to rotate the scoop. When the latch 29 is retained in its raised position, the scoop will return to its carrying position upon release of the clutch by its own weight.

If it is desired to hold the scoop in its semi-inverted position after dumping, the lever 35 is held in operating position by the rope 48 and the rope 50 is allowed to pass through the opening 51, the slackness in the rope 50 permitting the latch arm 29 to drop to engaging position with the draw-head 25 (Fig. 5). When the scoop is to be returned to its load carrying position, it may be done by drawing on the rope 50 which will slip through the opening 51 in the upper end of the lever 35 and raise the latch 29, which will permit the scoop to drop to its carrying position and the draw-head 25 to slide along the rods 26 until it reaches the clevis plate 27. The ropes 48 and 50 may be connected to rope extensions and thus a plurality of scoops may be connected together and operated at the same time by the operator of the tractor that may be used for drawing the scoops.

The scoop 5 may be maintained in the dumping position without the employment of the latch bar 29 if the rods 23 are so adjusted as to length that the scoop will rotate in a counter-clockwise direction as viewed in Fig. 4 so that the center of gravity thereof is to the left of a line vertically through the axes of the supporting wheels and when the scoop and its associated parts are in this position the scoop will ride along without being held by any latch or similar engaging means. If the scoop is held in the elevated position in this manner a lowering thereof may be accomplished by engaging the clutch which will tend to cause a further counter-clockwise movement of the scoop and accordingly an extension of the springs 17 and after the clutches have been engaged for a short while a sudden release thereof will cause the springs to snap back the scoop so that the position of the center of gravity of the scoop and its associated parts is to the right of the vertical plane passing through the axes of the supporting wheels and when the scoop is so snapped back a slight engagement of the clutches may again be effected to gradually lower the scoop into the carrying or scooping position.

In order to accommodate a full capacity load in the scoop and to prevent dropping of portions of the material before it is dumped, an apron 55 is located near the forward edge of the scoop 5. The apron 55 extends between the sides of the scoop and is arcuate in form to cause a packing action on the material in the forward end of the scoop. As the scoop is lowered or raised to its dumping position, the apron is moved upward and forward, with respect to the movements of the scoop, by the movement of its supporting members. The apron is pivotally connected near its bottom to a pair of pivotally mounted link members 56 and its top is supported by chains and by a pair of arms 58. The guide arms 57 are loose on the shaft 37 and the arms 58, which are keyed to the shaft, lift the apron 55 as the shaft 37 is rotated by the connection between the shaft 1 and the wheels 2. If desired, the arms 58 may also be loosely mounted upon the shaft 37, and if this arrangement is adopted, such apron will at all times remain suspended in such a manner that when the scoop is gathering material, its lower edge will be free to swing inwardly and in such a manner that pressure from its rear edge will be effectively resisted. In other words, if such apron is disposed in this latter manner, it will normally and at all times have about the same position as it is shown as having in Fig. 1, and when the scoop is in its collecting position, the lower edge of such apron will partially close the open end of the scoop, while yet being free to swing inwardly with the contacting portions of the entering material but not outwardly with any material which tends to leave the scoop either while the collecting is in progress or after the scoop has been raised to its conveying position. Thus the invention provides an exceedingly efficient means for removing earth from one point and dumping it at another. Also, it provides a means whereby a plurality of vehicle scoops embodying my invention may be connected in tandem and controlled by the operator of the tractor.

When the above described scoop is being moved from its conveying position to the collecting position, the pivotal connections between the links 23 and the bowl 5 will describe an arc from their extreme rearward locations to their extreme forward locations, and this arc will continuously tend in a forward direction; on the other hand, the pivotal connections between the short arms of the bell crank levers 16 and the bowl 5 will describe an arc which first tends forwardly and which then reverses and tends rearwardly. Such forward motion of these latter connections when considered with relation to a fixed and vertical plane is greater than the similar motion of the connection of the links 23 which occurs at the same time, and therefore the bottom of the scoop will be inclined forwardly when these points of the greatest forward movement of the pivotal connections of the levers 16 have been passed, such pivotal connections will then tend rearwardly but the connections of the links 23 will continue to move forwardly. The opposed nature of these latter movements will neutralize the effects of the opposed movements which occurred during the first part of the bowl motion above described, and as a consequence, the scoop bottom will again be positioned horizontally. When the scoop is returned from its collecting position to its conveying position, these movements will occur in a reversed manner, and the bottom of such scoop will first be inclined upwardly from its forward edge and then it will gradually assume a horizontal position as the limit of its upward travel is approached.

The portions of the scoop member 5 which extend between its side and rear walls and its bottom are rounded for facilitating the collecting and dumping operations, and a further feature of the machine which I have provided is the upward and rearward inclination of the rods 26, such inclination of these rods being preferable because of its avoidance of the likelihood of their being bent if the forward portion of the machine should run upon a stone or other obstruction too large to pass beneath in the usual manner.

It will be apparent from an examination of Fig. 3 of the drawings that the leverage of the upper ends of the bell cranks 16 shifts from a maximum when such ends are in their extreme upper position to a minimum when such ends are in their extreme lower positions and that this changing leverage will be effective to equalize the tractive effort required of the wheels even though the retractive force of the springs 17 when such levers are in their lower positions is far greater than when such levers are in their upper positions.

This application is a refile of abandoned application Serial No. 341,749, filed Feb. 21, 1929.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a wheeled vehicular scoop, a frame, a rotatable member, a clutch member for connecting the rotatable member to one of the wheels of the vehicle, a scoop member connected to the rotatable member and operated by the rotatable member to lower the scoop member and to dump the scoop member, a link for determining the position of the scoop member relative to the frame as it is operated on by the rotatable member, means for connecting the link to the frame to selectively determine the operation of the scoop member as to lowering the scoop and as to dumping the scoop member by the rotation of the rotatable member, and a pull cord for actuating the clutch members to connect the rotatable member to one of the wheels and for operating the said connecting means of the link.

2. In a wheeled vehicular scoop, a frame, an axle yoke member rotatably supported in the frame, a clutch member for connecting the yoke to one of the wheels of the vehicle, a scoop member connected to the yoke and operated by the yoke to lower the scoop member and to dump the scoop member, a link for determining the position of the scoop member relative to the frame as it is operated on by the yoke, means for connecting the link to the frame to selectively determine the operation of the scoop member as to lowering the scoop and as to dumping the scoop by the rotation of the yoke, a member for actuating the clutch member and a slip connector member between the said clutch actuating member and the said connecting means for operating the said connecting means and the clutch actuating member in succession.

Signed by me this 30th day of August, 1930.

JULIUS E. PATTERSON.